Nov. 19, 1963

G. R. GAMERTSFELDER ET AL 3,111,664

TELEVISION NAVIGATION AID

Filed Nov. 15, 1960

INVENTOR.
GEORGE R. GAMERTSFELDER
GUS STAVIS

BY

ATTORNEY.

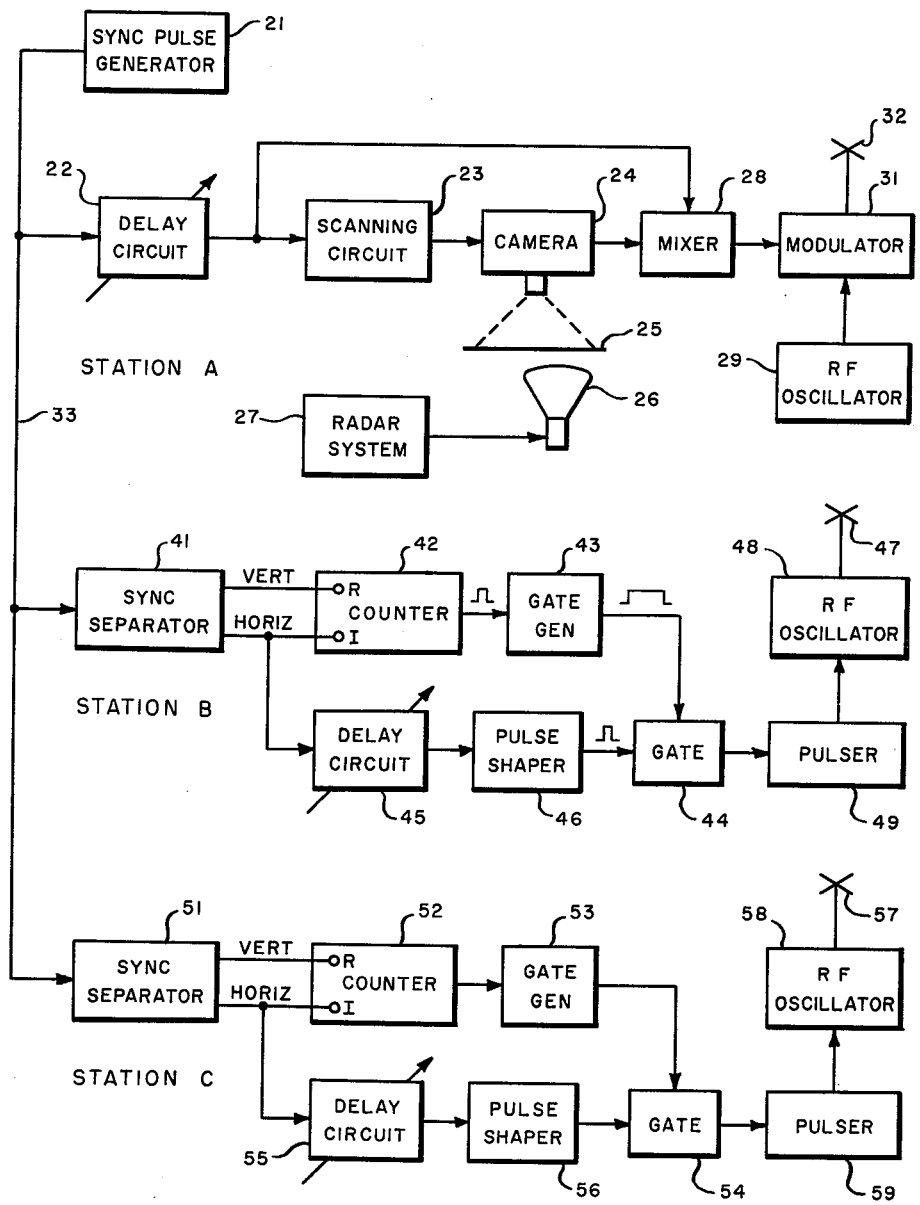

United States Patent Office 3,111,664
Patented Nov. 19, 1963

3,111,664
TELEVISION NAVIGATION AID
George R. Gamertsfelder, Pleasantville, and Gus Stavis, Briarcliff Manor, N.Y., assignors to General Precision, Inc., a corporation of Delaware
Filed Nov. 15, 1960, Ser. No. 69,385
9 Claims. (Cl. 343—6)

This invention relates generally to aids to navigation, particularly to such aids in which a television signal indicative of the objects within a harbor area is broadcast for the benefit of any ship in the harbor equipped with a television receiver.

Systems have been proposed which televise to a harbor area the plan position indication (PPI) display of a shore based radar station thereby enabling a shipboard operator to view an image of the fixed and moving objects in the harbor. Such systems are quite attractive, especially during periods of poor visibility, because they give the shipboard operator the benefit of the display generated by bulky and expensive radar equipment while the only equipment required on board ship is an inexpensive television receiver. Additions to the basic system have been proposed which enable the shipboard operator to identify the position of his own ship on the receiver screen. One such arrangement is described and claimed in the copending application of Roberts, Slawsky and Stavis, Serial No. 61,132, filed October 7, 1960, for Radar and Television Navigation Aid, which application is assigned to the same assignee as is the instant application. Another arrangement is described and claimed in the copending application of Gus Stavis, Serial No. 67,827, filed November 7, 1960, for Radar and Television Navigation Aid, which application is also assigned to the same assignee as the instant application. The former application describes a system which, in addition to an omnidirectional antenna broadcasting the PPI display, employs a first narrow beam rotating directional antenna at the same location as the omnidirectional antenna and a second narrow beam rotating antenna at a remote location, each of which directional antennas radiates a signal giving bearing information enabling the shipboard operator to locate his ship on the receiver screen. The latter application describes a system in which an omnidirectional antenna televises both the PPI display and a family of hyperbolae superimposed thereon. A rotating directional antenna at a remote location transmits a signal which generates a bearing line on the receiver screen, which line determines both the particular hyperbola intersecting the image of one's own ship and the point of such intersection. Each of these systems, while satisfactory, requires one or more rotating directional antennas which are complex, bulky, and expensive.

It is a general object of the present invention to provide a navigation aid by which a shipboard operator may determine his position simply by viewing a television receiver screen.

Another object is to provide a navigation aid by which a shipboard operator may view images of his own ship and surrounding objects on a teelvision screen and may also identify the image of his own ship.

Another object is to provide a navigation aid as above described which does not require the use of any directional antennas.

Briefly stated, the invention employs first, second and third omnidirectional antennas installed at different locations. A television camera views, in part, a representation of an area of operations, such as a chart or map but preferably a radar PPI display. Superimposed on the representation are two families of hyperbolae, one family having foci at the first and second antenna locations and the other having foci at the first and third antenna locations. The camera also views two stationary horizontal scales. A television signal in accordance with the scene viewed by the camera is broadcast over the first antenna with the result that a television receiver in the area displays an image of the representation with the hyperbolae superimposed and, on another part of the screen, displays the two horizontal scales. The second and third antennas transmit pulses which appear as spots adjacent to the horizontal scale marks. The positions at which these spots appear identify one hyperbola of each family, thereby determining the location of the receiver.

For a clearer understanding of the invention, reference may be made to the following detailed description and the accompanying drawing, in which:

FIGURE 3 is a schematic diagram of the apparatus of the invention.

The invention may be most readily understood by first considering the image appearing on the screen of a television receiver within the harbor area, after which the apparatus for transmitting signals to produce such an image will be explained.

Figure 1:
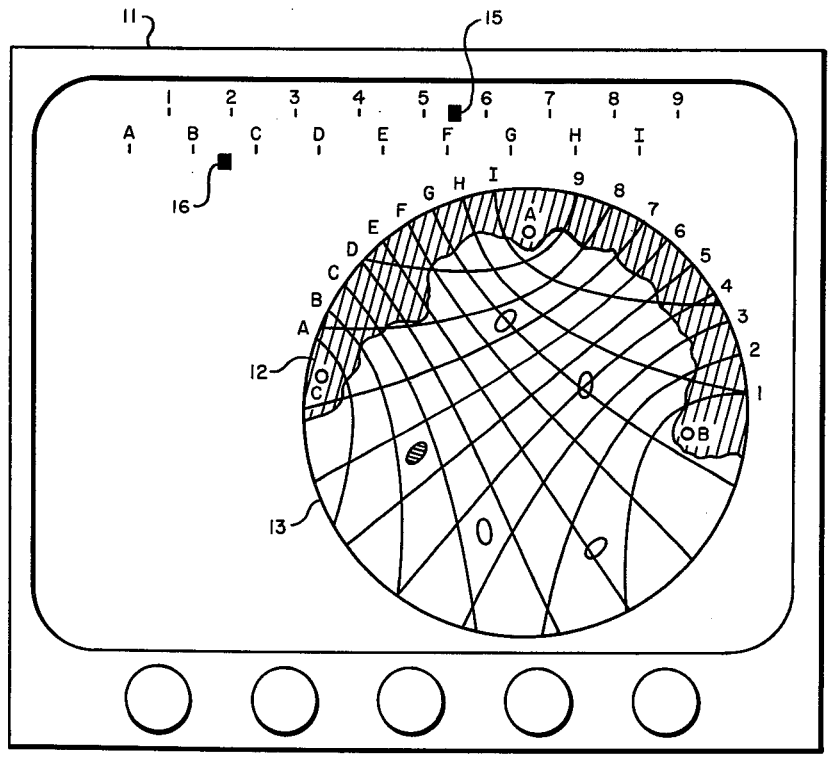
FIGURE 1 is a view of the screen of a television receiver installed on a ship within the harbor area.

Referring first to FIGURE 1, there is shown a television receiver 11 assumed to be installed on a ship in the harbor. The screen of the receiver 11 displays, in the circular portion shown, the PPI display of a shore based radar station. This display is televised, as will be more fully explained, with the aid of a television camera positioned to include within its field of view the face of the cathode ray tube of a conventional radar system. There can be seen a land mass 12, shown cross-hatched, several blips representing ships, and the locations A, B and C of three omnidirectional television transmitting stations. The stations have been shown, for convenience of explanation, as lying within the field of view of the radar system and the television camera but it will be understood that any or all of the stations may be located outside such field of view. Also shown are two families of hyperbolae, one family having foci at A and B, the other family having foci at A and C. At the top of the screen are two horizontal scales, one marked with the numerals 1–9 inclusive and the other marked with the letters A–I inclusive.

Station A transmits a complete television signal including synchronizing pulses, the PPI display, the hyperbolae, and the two horizontal scales. Such transmission is achieved with a rectangular mask or overlay placed over the radar screen and viewed by a television camera. The rectangular shape corresponds to the normal aspect ratio of standard television practice and includes a circular transparent portion 13 covering the usual round cathode ray tube of the radar system, which portion is inscribed with white hyperbolic lines. The remainder of the overlay is of a white opaque material and is inscribed just outside the circle with black numerals and letters identifying each hyperbola and at the top with black scale marks and black numerals and letters identifying the scale marks.

The horizontal scales at the top of the screen and the marker spots to be described occupy a vertical band near the top of the screen of sufficient height to assure adequate definition of the numerals, letters, scale marks and marker spots. In standard commercial television practice a minimum of ten horizontal lines are usually allotted for numerals or figures. For illustrative purposes it will be assumed that fourteen lines are to be reserved for each row, thereby assuring adequate definition even if the receiver adjustments are not optimum. The first ten lines are left vacant as a precautionary measure. The next fourteen lines are devoted to the row of numerals and their scale marks, then fourteen lines are reserved for a marker spot, the next fourteen lines are occupied by the row of letters and their scale marks, and the final fourteen lines are reserved for a second marker spot.

The stations B and C each transmit pulses only, these pulses being synchronized, as will be more fully explained, with the synchronizing pulses generated by station A so as to appear as marker spots in the spaces reserved just below the row of numerals and letters respectively. Since the scanning circuits of the receiver 11 are controlled by the pulses from station A, the horizontal position of the marker spot 15, transmitted by station B, will depend upon the difference in the distances from the ship to stations A and B. Therefore, the horizontal position of the marker spot 15 identifies one hyperbolic line of position of the ship. Similarly, the horizontal position of the marker spot 16, transmitted by station C, identifies the other hyperbolic line of position.

In the example illustrated by FIGURE 1, the marker spot 15 appears between the numerals 5 and 6 while the marker spot 16 appears between the letters B and C. Therefore, assuming the horizontal scales have been properly correlated with the distance between hyperbolae and the horizontal sweep rate, the blip representing the ship carrying the receiver is identified as that blip lying in the area bounded by the four hyperbolae 5, 6, B and C.

In order to position the horizontal scale marks properly, the synchronization between stations A and B is first adjusted, by means to be fully described, so that, when the receiver is equidistant from stations A and B, the marker spot 15 lies at some intermediate position along the width of the screen. The hyperbola 5 is the perpendicular bisector of the line joining stations A and B and is the locus of points equidistant from stations A and B. Accordingly, the scale mark 5 is placed on the overlay at the corresponding intermediate position. FIGURE 1 illustrates a case in which that intermediate position is approximately at the center of the screen and overlay although it is obvious that the locations of the stations A and B with respect to the harbor area of interest may make it more advantageous to place the intermediate position at some other location, such as ¼ or ⅝ of the way across the screen.

Figure 2:
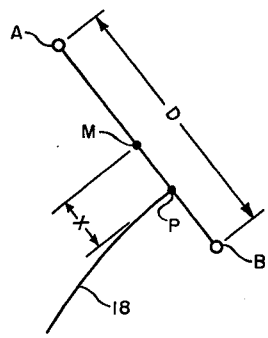
FIGURE 2 is a diagram useful in explaining the invention.

There remains to be determined the displacement of the remaining scale marks from the mark 5 established as above. Turning now to FIGURE 2, there are shown the locations of stations A and B, D miles apart, and the midpoint M between them. The ship carrying the receiver is assumed to be at point P, $x$ miles from M. The distance $$AP = \frac{D}{2} + x$$

miles, the distance $$PB = \frac{D}{2} - x$$

miles, from which $AP - PB = 2x$ miles. If two signals be transmitted simultaneously from stations A and B, the signal from A will not reach the receiver until $2x/c$ microseconds after the arrival of the signal from station B, where $c$ is the velocity of propagation in miles per microsecond. The same delay will occur if the receiver be located anywhere on the hyperbola 18, whose vertex is at P and whose foci are at A and B.

When the receiver is at the midpoint, M, the signal from station B representing the marker spot 15 is delayed with respect to the portion of the signal from station A representing the start of the corresponding horizontal scan line by an arbitrary amount sufficient to cause the marker spot to appear at the intermediate position heretofore described. When the receiver is at point P, the delay is $2x/c$ microseconds less than before and accordingly the marker spot will be displaced to the left of the scale mark 5 by a distance equal to the distance travelled by the electron beam in $2x/c$ microseconds. Since, in standard commercial television practice, approximately 53.5 microseconds are required for the beam to travel completely across the screen from left to right, the displacement of the marker spot from the scale mark 5 is obviously $$\frac{2x}{c} \cdot \frac{W_R}{53.5}$$

inches, where $W_R$ is the width in inches of the receiver screen. The scale mark should be placed on the overlay at a corresponding position which obviously is at a point displaced from the scale mark 5 by a distance $$\frac{2x}{c} \cdot \frac{W_0}{53.5}$$

inches, where $W_0$ is the width in inches of the overlay viewed by the television camera.

Consider a specific example in which the vertex of the hyperbola 4, FIGURE 1, is ½ mile from the hyperbola 5 (the perpendicular bisector) and in which the width of the overlay (which is the same as the width of the field of view of the television camera) is 22 inches. Then the scale mark 4 is placed on the overlay to the left of the scale mark 5 a distance $$\frac{2 \cdot \frac{1}{2}}{0.186} \cdot \frac{22}{53.5}$$

or 2.2 inches.

The positions of the other scale marks are located in a like manner.

The marker spot 15 may appear at any horizontal position on the screen. Since the time required for the electron beam to travel completely across the screen is 53.5 microseconds, the difference in arrival times for receiver locations on hyperbolae at opposite extremes of the grid must not exceed 53.5 microseconds. In other words, referring to FIGURE 1, the difference in the times of arrival of signals from A and B for a receiver on hyperbola 1 minus the difference in the times of arrival of signals from A and B for a receiver on hyperbola 9 must not exceed 53.5 microseconds.

Consider the situation when the receiver is somewhere on the line joining stations A and B, that is, the situation at the vertexes of the hyperbolae. If $x_1$ is the displacement from the midpoint of the vertex of hyperbola 1 and $x_9$ is the displacement from the midpoint of hyperbola 9, the above conditions may be expressed mathematically as follows.

$$\frac{2x_1}{c} - \frac{2x_9}{c} \leq 53.5 \ \mu\text{sec.}$$

$$x_1 - x_9 \leq 5 \text{ miles}$$

Thus, proper operating conditions can be assured by selecting the locations of the stations so that the vertexes of the extreme hyperbolae are not more than five miles apart. This does not means that the area of operations is limited to a width of five miles because the stations may be located inland, whereupon the portions of the hyperbolae of interest will be separated by more than five miles.

It will be obvious that although but nine hyperbolae per family have been illustrated, more may be used if desired.

Turning now to FIGURE 3, these is shown the apparatus by which the various signals heretofore discussed are generated. In general, station A is shown at the top, station B is the middle, and station C at the bottom. More particularly, there is shown a synchronizing generator 21 which generates the vertical, horizontal and equalizing pulses of standard television practice. The pulses from the generator 21 may be passed through a variable delay circuit 22, for purposes which will appear, and control a scanning circuit 23 which generates the various waveforms required for controlling the electron beam of a television camera. The camera 24 receives the waveforms from the circuit 23 and views a scene comprising a mask or overlay 25 and the screen of the cathode ray tube 26 on which the radar PPI display is presented in response to signals from a radar system 27. The video signal from the camera 24 is passed to a mixing circuit 28 where synchronizing pulses are added to form a complete video signal. The output of a radio frequency oscillator 29 is amplitude modulated by the composite video signal in a modulator 31, and the modulated signal is radiated by an omnidirectional antenna 32.

The synchronizing pulses from the generator 21 are transmitted over a land line 33 or equivalent link to station B where they enter a synchronizing pulse separator circuit 41 which separates the vertical and horizontal pulses. The land line 33 inherently delays the transmission of the synchronizing pulses and it is the purpose of the delay circuit 22 to introduce a like delay in the application of synchronizing pulses to the scanning circuit 23 of station A. While it is possible, and may even be desirable, to eliminate the delay circuit 22, the invention may be more readily understood by assuming its presence and accordingly, for the present, it will be assumed that the delay circuit 22 is adjusted so that the synchronizing pulses enter the scanning circuit 23 and the separator circuit 41 in exact time phase.

The vertical and horizontal pulses from the separator circuit 41 are applied to the reset and input terminals respectively of a counter 42 of conventional construction which counts a predetermined number of pulses applied to its input terminal and in response thereto emits a single short output pulse, after which it remains quiescent until reactivated by the application of a pulse to the reset terminal whereupon the cycle is repeated. The output pulse from the counter 42 triggers a gate generating circuit 43 which generates a comparatively long pulse of about 444.5 microseconds duration, which in turn is applied to and unlocks a gate 44, permitting pulses applied to the input to pass to the output.

The horizontal pulses from the separator circuit 41 are also applied to an adjustable delay circuit 45 which may be adjusted to have any desired delay from zero to the duration of one complete horizontal line or about 64 microseconds. The pulses from the delay circuit 45 are passed through a pulse shaping circuit 46 where the waveform is squared and amplified, after which they are applied to the input terminal of the gate 44. If a pulse from the gate generator 43 is present, the pulses applied to the input pass to the output.

An omnidirectional antenna 47 is connected to a radio frequency oscillator 48 which is constructed to pass oscillatory energy to its output during and only during the application of a suitable voltage thereto. The oscillator 48 may, for example, include a stage of amplification in the output circuit which is normally biased to cut off but which is rendered operative by the application of a voltage, or it may comprise an oscillatory circuit in which the generation of oscillations is inhibited except when an enabling voltage is applied. In any event, the voltage enabling energy to pass to the antenna 47 is obtained from a pulse generating circuit or pulser 49 which in turn is triggered by the pulses appearing at the output of the gate 44.

As previously discussed in connection with FIGURE 1, it is desired that station B emit a signal such as to place a marker spot occupying a portion of the twenty-fifth through the thirty-eighth visible horizontal scan lines of the receiver 11. To accomplish this, the counter 42 is reset by each vertical synchronizing pulse whereupon it starts to count horizontal pulses. In accordance with standard television practice about seventeen equalizing and horizontal pulses occur between the vertical pulse and the first visible line. The first twenty-four visible lines are to be left blank but, because interlaced scanning is employed, this amounts to leaving blank the first twelve lines of each field. Therefore, the counter 42 is adjusted to count seventeen plus twelve or twenty-nine horizontal pulses after which a single output pulse is generated which triggers the gate generator 43.

The gate should be unblocked for the duration of fourteen scan lines or seven lines per field. Since each line requires 63.5 microseconds, the gate generator 43 is adjusted to generate a pulse approximately 444.5 microseconds in duration.

The horizontal pulses pass through the delay circuit 45 and the pulse shaper 46 to the gate 44, as previously described. The pulse from the gate generator 43 opens the gate 44 during and only during the twenty-fifth through the thirty-eighth visible lines and accordingly the oscillator 48 emits a short pulse during each of these lines. The horizontal position at which these pulses appear on the receiver screen depends upon the adjustment of the delay circuit 45.

The oscillator 48 operates at substantially the same frequency as the oscillator 29, but no attempt is made to synchronize the two. It is only necessary that the frequencies be close enough together so that the receiver accepts signals from either without retuning. It is sufficient if each oscillator be controlled by its own crystal, the two crystals having the same nominal frequency.

It will be recalled, by reference to FIGURE 1 and the previous description thereof, that the overlay 25 is white with no markings in the space reserved (the twenty-fifth through the thirty-eighth lines) for the marker spot from station B. Since the television camera 24 is viewing a white scene during the scanning of these lines, the radio frequency signal from station A is at a very low level, 15% or less of maximum amplitude. Accordingly, a strong signal from station B, whether in or out of phase with that from station A, will create a strong field in the vicinity of the receiver 11, causing a black marker spot to appear on the receiver screen.

To set up the apparatus, the overlay 25 is constructed, the scale marks being positioned with due regard for the distance between hyperbolae, as previously explained. The delay circuit 22 at station A is next adjusted until the synchronizing pulses entering the separator circuit 41 are in time phase with those entering the scanning circuit 23. The counter 42 is set to count twenty-nine pulses, and the gate generator 43 adjusted to generate a pulse about 444.5 microseconds wide. With a receiver equidistant from stations A and B, the delay circuit 45 is adjusted to place the marker spot 15 opposite the scale mark 5.

Station C is identical to station B and includes a synchronizing pulse separator 51, a counter 52, a gate generator 53, a gate 54, a delay circuit 55, a pulse shaper 56, an antenna 57, an oscillator 58, and a pulser 59. Operation is identical to that of station B.

When the set up procedure for station C is considered, it is noted that, because the distances from station A to stations B and C will not in general be identical, no adjustment of the delay circuit 22 of station A can make the synchronizing pulses enter the scanning circuit 23 and each of the separator circuits 41 and 51 at the same time. However, when it is realized that the counters 42 and 52 introduce substantial delay, it is seen that the delay circuit 22 is superfluous. It is only necessary to adjust each of the counters 42 and 52 until the marker spots appear at the proper vertical positions on the receiver screen and then to adjust the delay circuits 45 and 55 until the spots appear at the proper horizontal positions.

From the foregoing description it is apparent that the present invention enables a shipboard operator to view images of the fixed and moving objects in a harbor and to identify the image representing his own ship. No cooperation or participation, such as the exchange of messages, is required of the operator, it only being necessary for him to view the screen, note the position of the marker spots, and pick out the image of his own ship. The only shipboard equipment required is a standard television receiver, modified or supplemented only to the extent necessary to enable it to receive signals at the frequency of the shore stations. The shore installation required is a standard radar system, such as may already be found in many harbor areas, plus the television equipment illustrated in FIGURE 3. No complex rotating directional antennas are required, simple "turnstile" antennas sufficing. If desired, they may be modified to favor radiation in the direction of the harbor area of interest.

There has been described an installation in which the television equipment for each of the three stations is located in the vicinity of its associated antenna. However, it would be possible to concentrate all of the equipment except the antenna at a single location, in which case the link between stations would be a radio frequency link. Operation would remain substantially the same since the delay described for the land line 33 would find its counterpart in the delay in the radio frequency links.

It is noted that the portion of the receiver screen to the left of the PPI display is vacant and therefore available for the transmission of information, such as weather reports, of interest to everyone within the harbor area. Techniques for placing messages at any desired point on a receiver screen are well known in the television art. Additionally, the sound channel may be used for similar purposes.

Although a specific embodiment of the invention has been described, many modifications will occur to those skilled in the art. It is therefore desired that the protection afforded by Letters Patent be limited only by the true scope of the appended claims.

What is claimed is:

1. A navigation aid, comprising, first, second and third transmitting stations, first means for transmitting from said first station a television signal representing an area of operations with a hyperbolic grid pattern superimposed thereupon, said grid pattern comprising two families of hyperbolae, one family having foci at said first and second stations and the other family having foci at said first and third stations, a television receiver within said area for reproducing on its screen an image in accordance with said signal, second means controlled by said first means for transmitting from said second station a signal causing a first spot to appear on said screen of said receiver, and third means controlled by said first means for transmitting from said third station a signal causing a second spot to appear on said screen, whereby the positions on said screen at which said spots occur determine the location of said receiver.

2. A navigation aid, comprising, first, second and third transmitting stations for radiating radio frequency energy at substantially the same carrier frequency, first means for transmitting from said first station a television signal representing an area of operations with a grid pattern superimposed thereupon, said grid pattern comprising two families of hyperbolae, one family having foci at said first and second stations and the other family having foci at said first and third stations, a television receiver within said area for reproducing on its screen an image in accordance with said signal, second means controlled by said first means for transmitting from said second station a signal causing a first single spot to appear on said screen of said receiver, and third means controlled by said first means for transmitting from said third station a signal causing a second single spot to appear on said screen, whereby the positions at which said first and second spots occur determine the difference in distances from said receiver to said first and second stations and from said receiver to said first and third stations, thereby determining the location of said receiver with respect to said grid pattern.

3. A navigation aid, comprising, a radar system including a cathode ray tube for generating an image representing the fixed and moving objects within an area of operations, first, second and third transmitting stations, a transparent mask overlying the face of said tube and inscribed with opaque marks in the form of two families of hyperbolae, one family having foci at said first and second stations, the other family having foci at said first and third stations, first means for transmitting from said first station a television signal representing said image with said hyperbolae superimposed thereupon, a television receiver within said area, said receiver including a viewing screen on which is reproduced an image in accordance with said signal, second means controlled by said first means for transmitting from said second station a signal causing a first spot to appear on said viewing screen, and third means controlled by said first means for transmitting from said third station a signal causing a second spot to appear on said screen, whereby the positions on said screen at which said spots appear determine the location of said receiver.

4. A navigation aid, comprising, a radar system including a cathode ray tube on the face of which is generated an image of the fixed and moving objects within an area of operations, first, second and third transmitting stations for radiating signals having substantially the same carrier frequency, a transparent mask overlying said face of said tube, said mask being inscribed with opaque marks in the form of two families of hyperbolae, one family having foci at points corresponding to said first and second stations, the other family having foci at points corresponding to said first and third stations, first means for transmitting from said first station a television signal representing said image with said hyperbolae superimposed thereon, a television receiver within said area for reproducing on its screen an image in accordance with said signal, second means controlled by said first means for transmitting from said second station a signal causing a first single spot to appear on said screen of said receiver, the position on said screen at which said first spot appears being indicative of the difference in the distances of said receiver from said first and second stations, and third means controlled by said first means for transmitting from said third station a signal causing a second single spot to appear on said screen of said receiver, the position on said screen at which said second spot appears being indicative of the difference in the distances of said receiver from said first and third stations, whereby the positions of said first and second spots determine the location of said receiver.

5. A navigation aid, comprising, a radar system including a cathode ray tube on the face of which is generated an image of the fixed and moving objects within an area of operations, first, second and third transmitting stations for radiating signals having substantially the same carrier frequency, a mask completely covering and extending beyond the boundary of said face of said tube, said mask comprising a transparent portion coextensive with said face of said tube and inscribed with opaque markings in the form of two families of hyperbolae, one family having foci at points corresponding to said first and second stations, the other family having foci at points corresponding to said first and third stations, the remainder of said mask having a white opaque background, first means for transmitting from said first station a television signal representing the surface covered by said mask including both the transparent and opaque portions, a television receiver within said area of operations for reproducing on its screen an image in accordance with said signal, second means controlled by said first means for transmitting from said second station a signal causing a first spot to appear on said screen of said receiver superimposed on the image of the white opaque portion of said mask, and third means controlled by said first means for transmitting from said third station a signal causing a second spot to appear on said screen of said receiver superimposed on the image of the white opaque portion of said mask, whereby the positions on said screen at which said spots appear determine the location of said receiver.

6. A navigation aid, comprising, first, second and third transmitting stations, a television camera, a synchronizing pulse generator for generating vertical and horizontal pulses in accordance with standard television practice, means including said camera and said pulse generator for transmitting from said first station a television signal representing an area of operations with a hyperbolic grid pattern superimposed thereupon, said grid pattern comprising two families of hyperbolae, one family having foci at said first and second stations and the other family having foci at said first and third stations, means controlled by said pulse generator for defining first and second predetermined time intervals between successive vertical pulses, means controlled by said pulse generator for defining third and fourth predetermined time intervals between successive horizontal pulses, means for radiating radio frequency energy from said second station during coincidence of said first and third intervals, and means for radiating radio frequency energy from said third station during coincidence of said second and fourth intervals.

7. A navigation aid, comprising, first, second and third transmitting stations for broadcasting radio frequency energy at substantially the same carrier frequency, a visual representation of an area of operations, a mask completely covering and extending beyond the boundaries of said visual representation, said mask comprising a transparent portion coextensive with said representation and inscribed with opaque markings in the form of two families of hyperbolae, one family having foci at points corresponding to said first and second stations, the other family having foci at points corresponding to said first and third stations, the remainder of said mask having a white opaque background, a television camera positioned to view the entire area of said mask, a synchronizing pulse generator for generating vertical and horizontal pulses in accordance with standard television practice, means including said camera and said pulse generator for transmitting from said first station a television signal indicative of the scene viewed by said camera, means controlled by said pulse generator for defining first and second predetermined time intervals between successive vertical pulses, said intervals occurring while said camera is scanning the white opaque portion of said mask, means controlled by said pulse generator for defining third and fourth time intervals between successive horizontal pulses, means for radiating radio frequency energy from said second station during the coincidence of said first and third time intervals, and means for radiating radio frequency energy from said third station during the coincidence of said second and fourth time intervals.

8. A navigation aid, comprising, a radar system including a cathode ray tube for generating on the face of said tube a visual representation of the fixed and moving objects within an area of operations, first, second and third antennas installed at first, second and third locations respectively for transmitting signals having substantially the same carrier frequency, a mask completely covering and extending beyond the edge of said face of said tube, said mask comprising a transparent portion coextensive with said face and inscribed with opaque markings in the form of first and second families of hyperbolae, said first family having foci at points corresponding to said first and second locations, said second family having foci at points corresponding to said first and third locations, the remainder of said mask having a white opaque background carrying first and second horizontal rows of black scale marks, the marks in said first row each corresponding to one hyperbola of said first family, the marks in said second row each corresponding to one hyperbola of said second family, first means for transmitting over said first antenna a television signal indicative of said visual representation with said hyperbolae superimposed thereon and the opaque portion of said mask, a television receiver within said area of operations for reproducing on its screen an image in accordance with said signal, second means controlled by said first means for transmitting over said second antenna a signal causing a first black spot to appear on said screen of said receiver adjacent to said first row of scale marks, and third means controlled by said first means for transmitting over said third antenna a signal causing a second black spot to appear on said screen adjacent to said second row of scale marks, whereby the positions of said first and second spots determine the location of said receiver.

9. A navigation aid comprising a radar system including a cathode ray tube for generating on the face of said tube a visual representation of the fixed and moving objects within an area of operations, first, second and third antennas installed at first, second and third locations respectively for transmitting signals having substantially the same carrier frequency, a mask completely covering and extending beyond the edge of said face of said tube, said mask comprising a transparent portion coextensive with said face and inscribed with opaque markings in the form of first and second families of hyperbolae, said first family having foci at points corresponding to said first and second locations, said second family having foci at points corresponding to said first and third locations, the remainder of said mask having a white opaque background carrying first and second horizontal rows of black scale marks, the marks in said first row each corresponding to one hyperbola of said first family, the marks in said second row each corresponding to one hyperbola of said second family, a television camera positioned to view both the transparent and opaque portions of said mask, a synchronizing pulse generator for generating vertical and horizontal pulses in accordance with standard television practice, means including said camera and said pulse generator for transmitting over said first antenna a television signal indicative of the scene viewed by said camera, means controlled by said pulse generator for defining first and second predetermined time intervals between successive vertical pulses, said first interval occurring while said camera is scanning a portion of said mask adjacent to said first row of scale marks, said second interval occurring while said camera is scanning a portion of said mask adjacent to said second row of scale marks, means controlled by said pulse generator for defining third and fourth predetermined time intervals between successive horizontal pulses, means for transmitting radio frequency energy from said second antenna during and only during coincidence of said first and third time intervals, and means for transmitting radio frequency energy from said third antenna during and only during coincidence of said second and fourth time intervals.

References Cited in the file of this patent

UNITED STATES PATENTS

| | | |
|---|---|---|
| 2,632,157 | Jones | Mar. 17, 1953 |
| 2,800,652 | Dippy | July 23, 1957 |